(12) United States Patent
Ji et al.

(10) Patent No.: US 11,934,204 B2
(45) Date of Patent: Mar. 19, 2024

(54) AUTONOMOUS DRIVING APPARATUS AND METHOD

(71) Applicant: HYUNDAI MOBIS Co., Ltd., Seoul (KR)

(72) Inventors: Yong Kwan Ji, Yongin-si (KR); Jun Han Lee, Yongin-si (KR); Jeong Hee Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 427 days.

(21) Appl. No.: 15/930,348

(22) Filed: May 12, 2020

(65) Prior Publication Data

US 2020/0371534 A1    Nov. 26, 2020

(30) Foreign Application Priority Data

May 20, 2019 (KR) .................. 10-2019-0058602
May 20, 2019 (KR) .................. 10-2019-0058604
May 20, 2019 (KR) .................. 10-2019-0058605

(51) Int. Cl.
    *G05D 1/02*    (2020.01)
(52) U.S. Cl.
    CPC ......... *G05D 1/0295* (2013.01); *G05D 1/0219* (2013.01); *G05D 1/0238* (2013.01); *G05D 1/0293* (2013.01)
(58) Field of Classification Search
    None
    See application file for complete search history.

(56) References Cited

U.S. PATENT DOCUMENTS

| | | | |
|---|---|---|---|
| 9,940,840 B1 | | 4/2018 | Schubert et al. |
| 10,930,159 B1 | * | 2/2021 | Jessen ...................... G08G 1/20 |
| 2017/0011633 A1 | | 1/2017 | Boegel |
| 2020/0160722 A1 | * | 5/2020 | Brugman ................. G08G 1/22 |
| 2021/0225172 A1 | * | 7/2021 | Ferguson ............... G08G 1/166 |

FOREIGN PATENT DOCUMENTS

| | | |
|---|---|---|
| DE | 10 2015 214 243 A1 | 2/2017 |
| DE | 11 2017 001 442 | 12/2018 |
| KR | 10-1998-0068399 | 12/1998 |
| KR | 10-2017-0020037 | 2/2017 |

OTHER PUBLICATIONS

Laurens Robert, et al. "Enhancements of V2X Communication in support of cooperative autonomous driving", 2015, IEEE Communications Magazine, pp. 64-70 (Year: 2015).*

Office Action dated Dec. 6, 2022 from the Korean Patent Office for Korean Patent Application No. 10-2019-0058605.

* cited by examiner

*Primary Examiner* — Hongye Liang
(74) *Attorney, Agent, or Firm* — H.C. Park & Associates, PLC

(57) ABSTRACT

An autonomous driving apparatus and method, in which the autonomous driving apparatus may include a sensor unit configured to detect a surrounding object including a surrounding vehicle around an ego vehicle that autonomously travels, a memory configured to store map information, and a processor configured to control autonomous driving of the ego vehicle based on an expected driving trajectory generated based on the map information stored in the memory.

20 Claims, 9 Drawing Sheets

AUTONOMOUS DRIVING APPARATUS AND METHOD

CROSS-REFERENCE TO RELATED APPLICATIONS

This application claims priority from and the benefit of Korean Patent Application Nos. 10-2019-0058602, 10-2019-0058604, and 10-2019-0058605, filed on May 20, 2019, which are hereby incorporated by reference for all purposes as if set forth herein.

BACKGROUND

Field

Exemplary embodiments relate to an autonomous driving apparatus and method applied to an autonomous vehicle.

Discussion of the Background

Today's automobile industry is moving towards an implementation of autonomous driving to minimize the intervention of a driver in vehicle driving. An autonomous vehicle refers to a vehicle that autonomously determines a driving path by recognizing a surrounding environment using an external information detection and processing function upon driving and independently travels using its own motive power.

The autonomous vehicle can autonomously travel up to a destination while preventing a collision against an obstacle on a driving path and controlling a vehicle speed and driving direction based on a shape of a road although a driver does not manipulate a steering wheel, an acceleration pedal or a brake. For example, the autonomous vehicle may perform acceleration in a straight road, and may perform deceleration while changing a driving direction in accordance with the curvature of a curved road in the curved road.

In order to guarantee the safe driving of an autonomous vehicle, the driving of the autonomous vehicle needs to be controlled based on a measured driving environment by precisely measuring the driving environment using sensors mounted on the vehicle and continuing to monitor the driving state of the vehicle. To this end, various sensors, such as a LIDAR sensor, a radar sensor, an ultrasonic sensor and a camera sensor, that is, sensors for detecting surrounding objects such as surrounding vehicles, pedestrians and fixed facilities, are applied to the autonomous vehicle. Data output by such a sensor is used to determine information on a driving environment, for example, state information such as a location, shape, moving direction and moving speed of a surrounding object.

Furthermore, the autonomous vehicle also has a function for optimally determining a driving path and driving lane by determining and correcting the location of the vehicle using previously stored map data, controlling the driving of the vehicle so that the vehicle does not deviate from the determined path and lane, and performing defense and evasion driving for a risk factor in a driving path or a vehicle that suddenly appears nearby.

Background of the Disclosure is disclosed in Korean Patent Application Laid-Open No. 10-1998-0068399 (Oct. 15, 1998).

The above information disclosed in this Background section is only for enhancement of understanding of the background of the invention and, therefore, it may contain information that does not constitute prior art.

SUMMARY

Exemplary embodiments of the invention provide an autonomous driving apparatus and method, which enable an autonomous vehicle to reach a destination within the shortest time while minimizing a computational load of autonomous driving control by the autonomous vehicle, by selectively applying a method of controlling the autonomous driving of the autonomous vehicle based on a driving trajectory up to the destination and a method of following the driving of a platooning group configured with a plurality of group vehicles.

Exemplary embodiments of the invention also provide an autonomous driving apparatus and method which can reduce a total of resources of a system necessary for each of group vehicles, belonging to a platooning group, to detect a surrounding object in such a manner that an autonomous vehicle changes a surrounding object sensing area based on a relative location with another group vehicle in a process of joining the platooning group and performing to platooning.

Additional features of the invention will be set forth in the description which follows, and in part will be apparent from the description, or may be learned by practice of the invention.

An exemplary embodiment of the invention provides an autonomous driving apparatus including a sensor unit configured to detect a surrounding object including a surrounding vehicle around an ego vehicle that autonomously travels, a memory configured to store map information, and a processor configured to control autonomous driving of the ego vehicle based on an expected driving trajectory generated based on the map information stored in the memory. The processor is configured to determine whether it is necessary to correct the expected driving trajectory of the ego vehicle, based on results of detection of a surrounding vehicle around the ego vehicle by the sensor unit, correct the expected driving trajectory based on a result of the determination, and perform trajectory-based control over the autonomous driving of the ego vehicle and to perform group following control over the autonomous driving of the ego vehicle so that the ego vehicle follows a driving of a platooning group configured with a plurality of group vehicles, when a first driving path of the ego vehicle up to a destination overlaps a second driving path of the platooning group. The processor is configured to control a sensing parameter of the sensor unit of the ego vehicle to have a value mutually dependent on a sensing parameter of a sensing unit mounted on each of the group vehicles, when performing the group following control. The sensing parameter includes one or more of a field of view (FOV) and sensor output.

When performing the trajectory-based control, the processor may be configured to generate an actual driving trajectory of the surrounding vehicle based on driving information of the surrounding vehicle detected by the sensor unit, generate an expected driving trajectory of the surrounding vehicle based on the map information stored in the memory, and determine that it is necessary to correct the expected driving trajectory of the ego vehicle, when a trajectory error between the actual driving trajectory and expected driving trajectory of the surrounding vehicle is a preset threshold value or more.

When performing the group following control, the processor may be configured to perform the group following control from a joining point, at which an overlap between the first and second driving paths is initiated, to a breakaway point, at which the overlap between the first and second driving paths is terminated, in a direction in which the ego vehicle travels up to the destination.

The processor may be configured to interchangeably perform the trajectory-based control and the group following control based on whether a predefined control changeover condition is satisfied. The control changeover condition includes a group following control changeover condition for a change from the trajectory-based control to the group following control and a trajectory-based control changeover condition for a change from the group following control to the trajectory-based control.

The processor may be configured to determine that the group following control changeover condition is satisfied and perform the group following control, when the ego vehicle reaches the joining point in a process of performing the trajectory-based control from a current location of the ego vehicle.

The processor may be configured to determine that the trajectory-based control changeover condition is satisfied and perform the trajectory-based control, when the ego vehicle reaches the breakaway point in a process of performing the group following control from the joining point.

The processor may be configured to determine the joining point and breakaway point for performing the group following control among a plurality of candidate joining points and a plurality of candidate breakaway points. The processor may be configured to determine, as the joining point and the breakaway point, a candidate joining point and candidate breakaway point, respectively, at which a total time required is a minimum, the total time required indicating a sum of a time taken for the ego vehicle to reach from the current location to the candidate joining point based on the trajectory-based control, a time taken for the ego vehicle to reach from the candidate joining point to the candidate breakaway point based on the group following control, and a time taken for the ego vehicle to reach from the candidate breakaway point to the destination based on the trajectory-based control.

When performing the group following control, the processor may be configured to change a surrounding object detection area of the sensor unit based on a relative location of the ego vehicle for a group vehicle belonging to the platooning group.

When performing the group following control, the processor may be configured to divide the platooning group into a preceding driving group, a middle driving group and a following driving group using a predefined group classification algorithm, determine a driving group to which the ego vehicle belongs among the driving groups, and change the surrounding object detection area of the sensor unit based on a result of the determination.

The processor may be configured to detect a surrounding object ahead of the ego vehicle through the sensor unit when the ego vehicle belongs to the preceding driving group, detect a surrounding object to either side of the ego vehicle through the sensor unit when the ego vehicle belongs to the middle driving group, and detect a surrounding object behind the ego vehicle through the sensor unit when the ego vehicle belongs to the following driving group.

The processor may be configured to control the sensing parameter of the sensor unit of the ego vehicle in response to a sensor control signal transmitted by a leader vehicle of the platooning group. The sensor control signal is generated for each of the group vehicles and transmitted to each of the group vehicle by the leader vehicle, based on a driving environment of the platooning group and a location of each of the group vehicles within the platooning group, so that a detection area and detection performance for a surrounding object are optimized at a level of the platooning group.

The processor may be configured to generate the sensor control signal for each of the group vehicles belonging to the platooning group and to transmit the sensor control signal to each of the group vehicles, based on a result of detection of a surrounding object by the sensor unit and the location of each of the group vehicles within the platooning group, when the ego vehicle has a position of the leader vehicle of the platooning group.

Another exemplary embodiment of the invention provides an autonomous driving method is a method of controlling autonomous driving in an autonomous driving system including a sensor unit configured to detect a surrounding object including a surrounding vehicle around an ego vehicle that autonomously travels, a memory configured to store map information, and a processor configured to control autonomous driving of the ego vehicle based on an expected driving trajectory generated based on the map information stored in the memory. The method includes determining, by the processor, whether it is necessary to correct the expected driving trajectory of the ego vehicle, based on results of detection of the surrounding vehicle around the ego vehicle by the sensor unit, correct the expected driving trajectory based on a result of the determination, and perform trajectory-based control over the autonomous driving of the ego vehicle, and performing, by the processor, group following control over the autonomous driving of the ego vehicle so that the ego vehicle follows a driving of a platooning group configured with a plurality of group vehicles, when a first driving path of the ego vehicle up to a destination overlaps a second driving path of the platooning group. In the performing of the group following control, the processor controls a sensing parameter of the sensor unit of the ego vehicle to have a value mutually dependent on a sensing parameter of a sensing unit mounted on each of the group vehicles. The sensing parameter includes one or more of a field of view (FOV) and sensor output.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
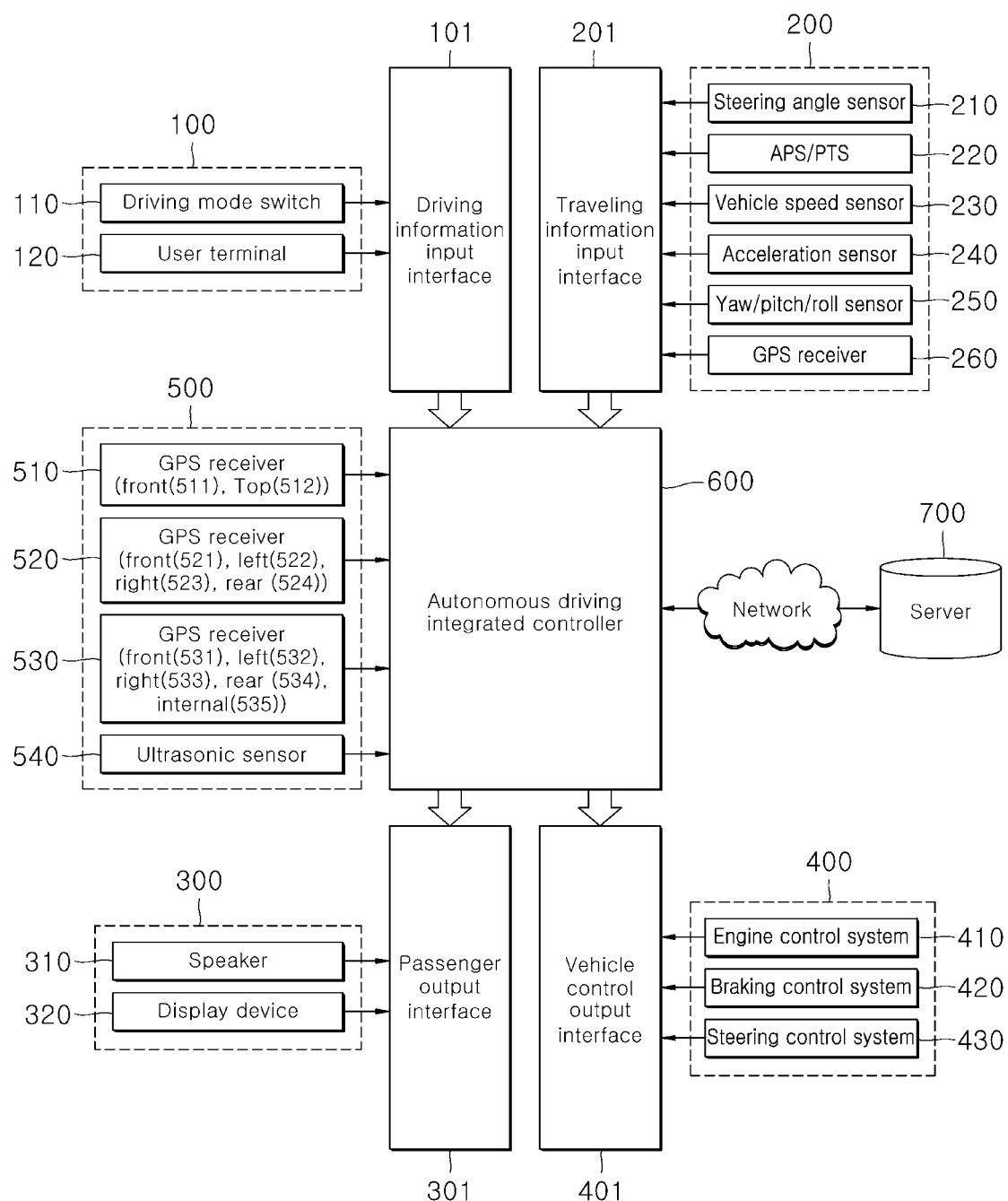
FIG. 1 is a general block diagram of an autonomous driving control system to which an autonomous driving apparatus according to an exemplary embodiment of the present invention may be applied.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Various advantages and features of the present invention and methods accomplishing thereof will become apparent from the following description of embodiments with reference to the accompanying drawings. However, the present invention is not to be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
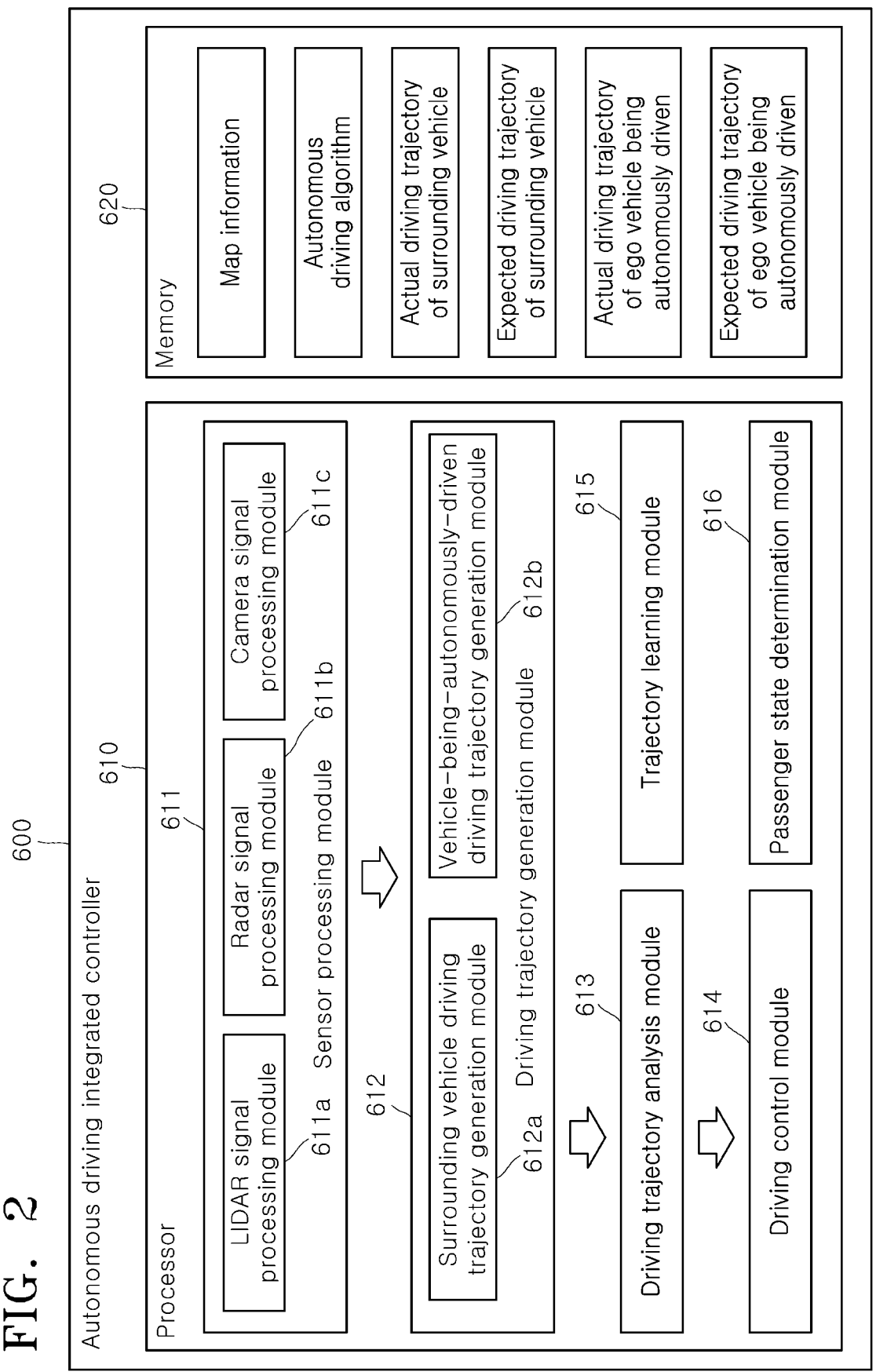
FIG. 2 is a block diagram illustrating a detailed configuration of an autonomous driving integrated controller in the autonomous driving apparatus according to an embodiment of the present disclosure.
Figure 3:
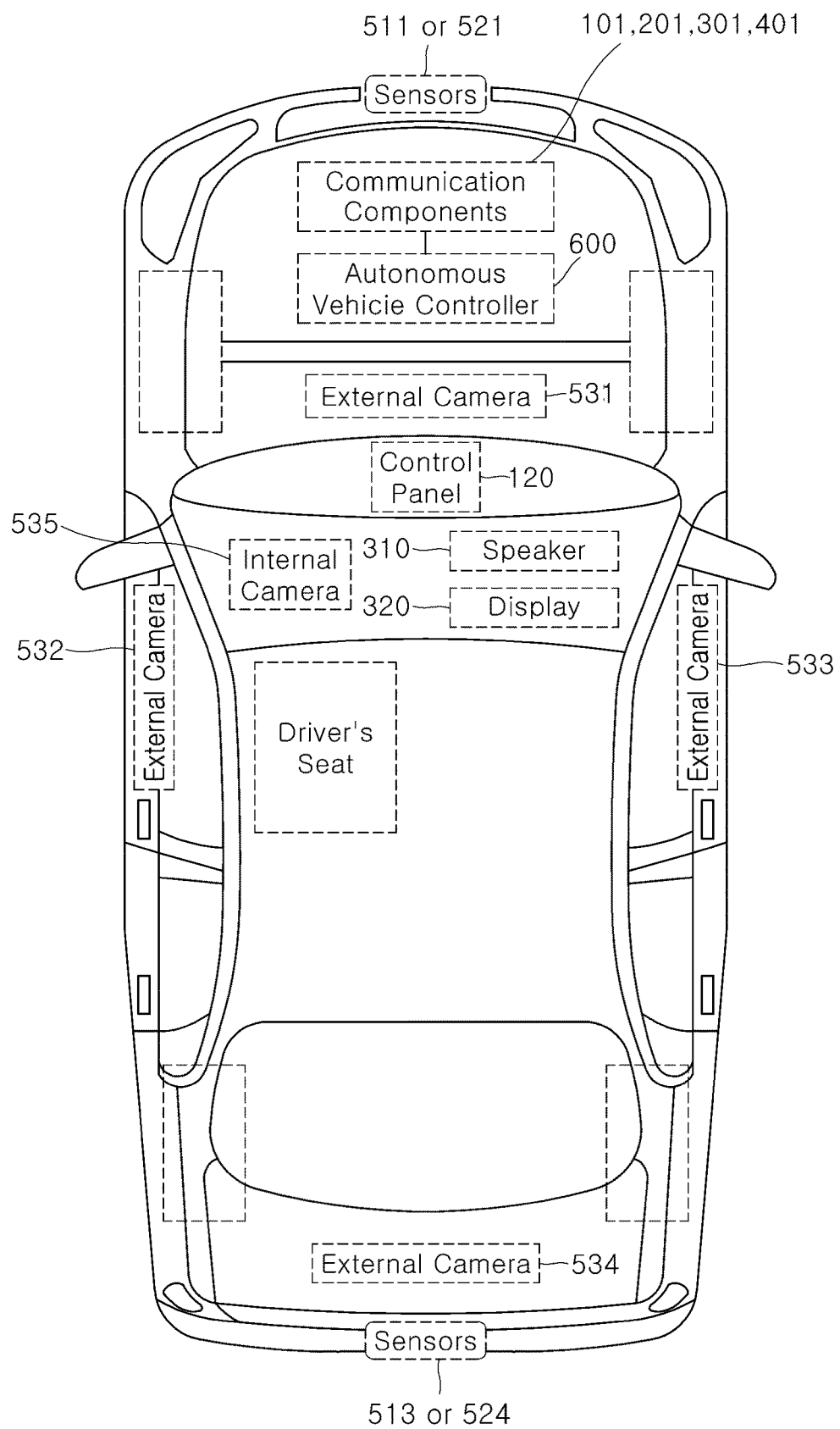
FIG. 3 is an exemplary diagram illustrating an example in which the autonomous driving apparatus according to an exemplary embodiment of the present invention is applied to a vehicle.
Figure 4:
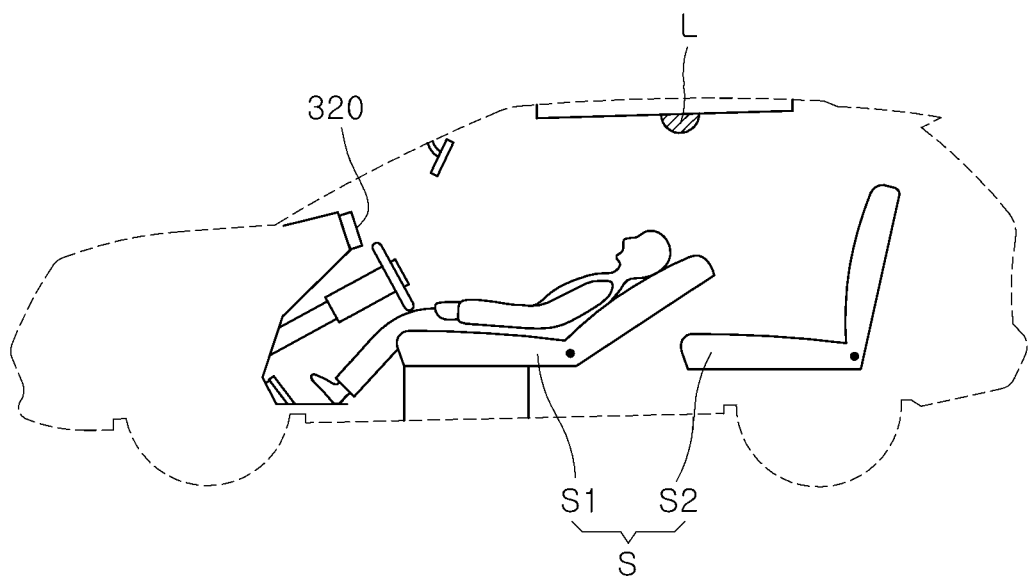
FIG. 4 is an exemplary diagram illustrating an example of an internal structure of a vehicle to which the autonomous driving apparatus according to an exemplary embodiment of the present invention is applied.
Figure 5:
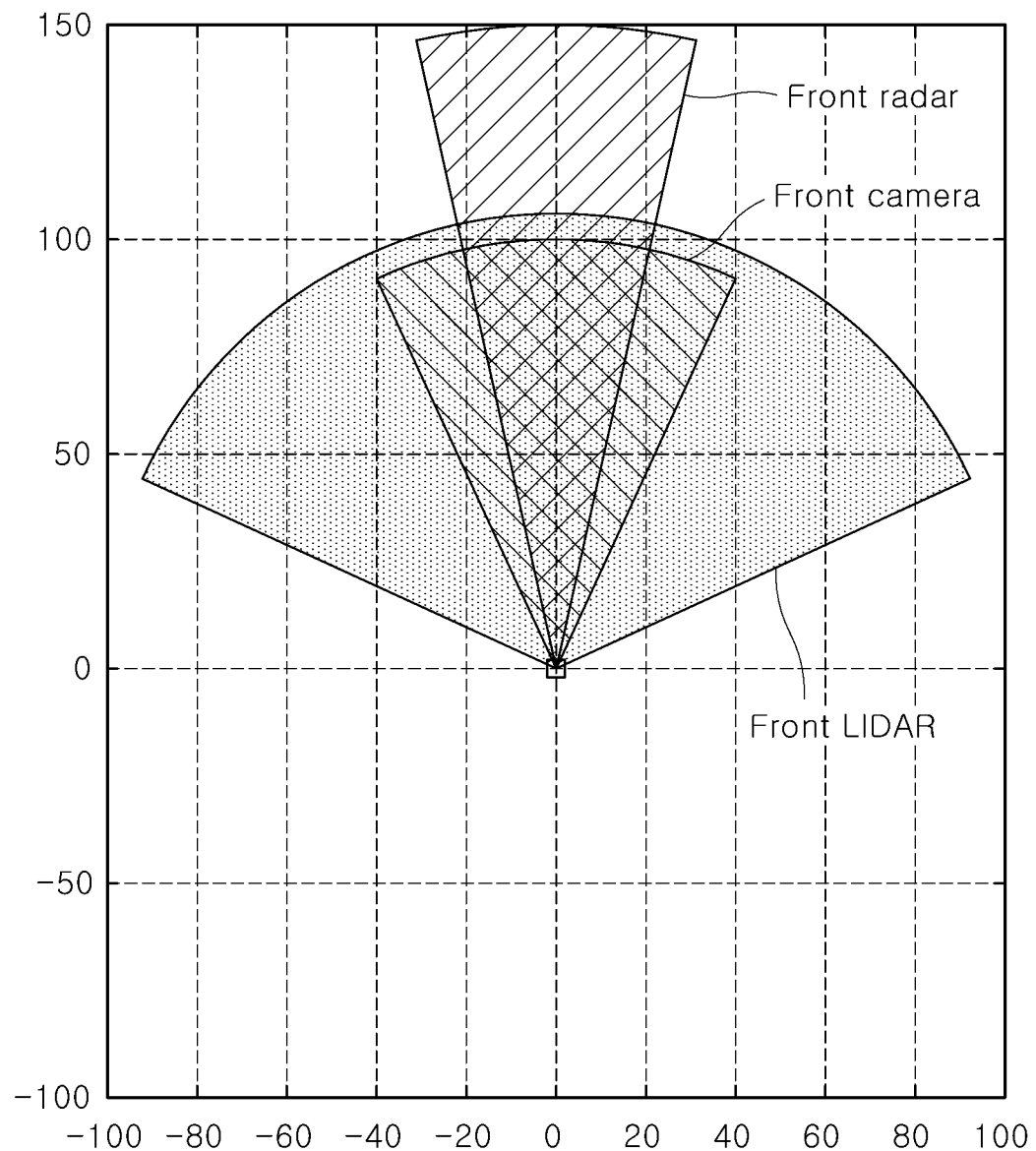
FIG. 5 is an exemplary diagram illustrating an example of a set distance and horizontal field of view within which a LIDAR sensor, a radar sensor and a camera sensor may detect a surrounding object in the autonomous driving apparatus according to an exemplary embodiment of the present invention.
Figure 6:
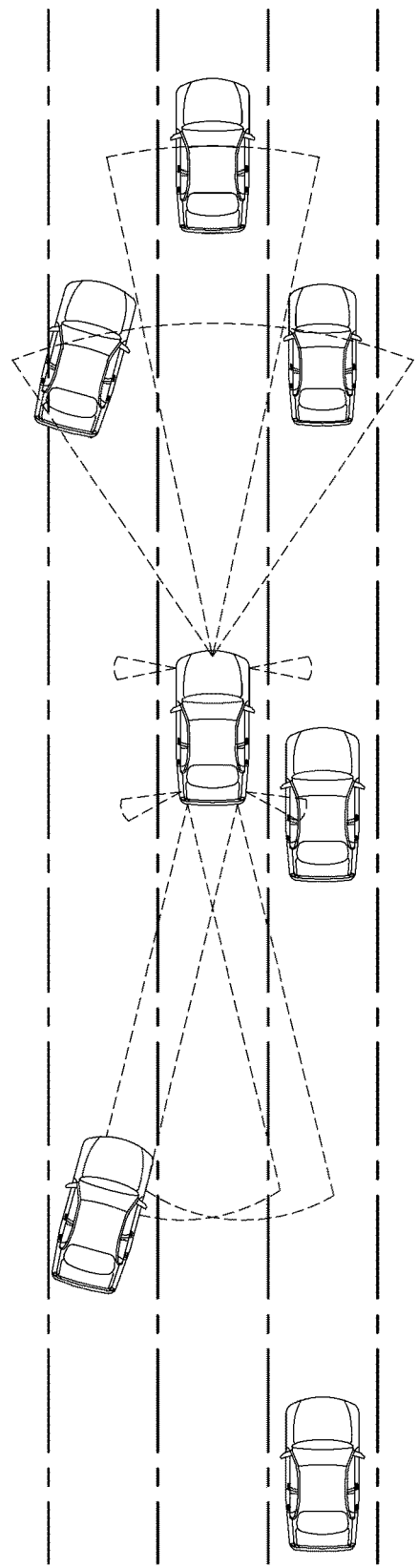
FIG. 6 is an exemplary diagram illustrating an example in which a sensor unit detects a surrounding vehicle in the autonomous driving apparatus according to an exemplary embodiment of the present invention.

FIG. 1 is a general block diagram of an autonomous driving control system to which an autonomous driving apparatus according to an exemplary embodiment of the present invention may be applied. FIG. 2 is a block diagram illustrating a detailed configuration of an autonomous driving integrated controller in the autonomous driving apparatus according to an exemplary embodiment of the present invention. FIG. 3 is an exemplary diagram illustrating an example in which the autonomous driving apparatus according to an exemplary embodiment of the present invention is applied to a vehicle. FIG. 4 is an exemplary diagram illustrating an example of an internal structure of a vehicle to which the autonomous driving apparatus according to an exemplary embodiment of the present invention is applied. FIG. 5 is an exemplary diagram illustrating an example of a set distance and horizontal field of view within which a LIDAR sensor, a radar sensor, and a camera sensor may detect a surrounding object in the autonomous driving apparatus according to an exemplary embodiment of the present invention. FIG. 6 is an exemplary diagram illustrating an example in which a sensor unit detects a surrounding vehicle in the autonomous driving apparatus according to an exemplary embodiment of the present invention.

First, the structure and functions of an autonomous driving control system to which an autonomous driving apparatus according to the present exemplary embodiment of the present invention may be applied are described with reference to FIGS. 1 and 3. As illustrated in FIG. 1, the autonomous driving control system may be implemented based on an autonomous driving integrated controller 600 configured to transmit and receive data necessary for autonomous driving control of a vehicle through a driving information input interface 101, a traveling information input interface 201, a passenger output interface 301 and a vehicle control output interface 401.

The autonomous driving integrated controller 600 may obtain, through the driving information input interface 101, driving information based on a manipulation of a passenger for a user input unit 100 in an autonomous driving mode or manual driving mode of a vehicle. As illustrated in FIG. 1, the user input unit 100 may include a driving mode switch 110 and a user terminal 120 (e.g., a navigation terminal mounted on a vehicle or a smartphone or tablet PC owned by a passenger), for example. Accordingly, driving information may include driving mode information and navigation information of a vehicle. For example, a driving mode (i.e., an autonomous driving mode/manual driving mode or a sport mode/eco mode/safe mode/normal mode) of a vehicle determined by a manipulation of a passenger for the driving mode switch 110 may be transmitted to the autonomous driving integrated controller 600 through the driving information input interface 101 as the driving information. Furthermore, navigation information, such as the destination of a passenger and a path up to the destination (e.g., the shortest path or preference path, selected by the passenger, among candidate paths up to the destination) input by a passenger through the user terminal 120, may be transmitted to the autonomous driving integrated controller 600 through the driving information input interface 101 as the driving information. The user terminal 120 may be implemented as a control panel (e.g., touch screen panel) that provides a user interface (UI) through which a driver inputs or modifies information for autonomous driving control of a vehicle. In this case, the driving mode switch 110 may be implemented as a touch button on the user terminal 120.

Furthermore, the autonomous driving integrated controller 600 may obtain traveling information indicative of a driving state of a vehicle through the traveling information input interface 201. The traveling information may include a steering angle formed when a passenger manipulates a steering wheel, an acceleration pedal stroke or brake pedal stroke formed when an acceleration pedal or brake pedal is stepped on, and various types of information indicative of driving states and behaviors of a vehicle, such as a vehicle speed, acceleration, a yaw, a pitch and a roll, that is, behaviors formed in the vehicle. The pieces of traveling information may be detected by a traveling information detection unit 200, including a steering angle sensor 210, an accel position sensor (APS)/pedal travel sensor (PTS) 220, a vehicle speed sensor 230, an acceleration sensor 240, and a yaw/pitch/roll sensor 250, as illustrated in FIG. 1. Furthermore, the traveling information of a vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201, and may be used to control the driving of a vehicle in the autonomous driving mode or manual driving mode of the vehicle.

Furthermore, the autonomous driving integrated controller 600 may transmit, to an output unit 300, driving state information, provided to a passenger, through the passenger output interface 301 in the autonomous driving mode or manual driving mode of a vehicle. That is, the autonomous driving integrated controller 600 transmits driving state information of a vehicle to the output unit 300 so that a passenger can check the autonomous driving state or manual driving state of the vehicle based on the driving state information output through the output unit 300. The driving state information may include various types of information indicative of driving states of a vehicle, such as a current driving mode, transmission range and vehicle speed of the vehicle, for example. Furthermore, if it is determined that it is necessary to warn a driver in the autonomous driving mode or manual driving mode of a vehicle along with the driving state information, the autonomous driving integrated controller 600 transmits warning information to the output unit 300 through the passenger output interface 301 so that the output unit 300 can output a warning to the driver. In order to output such driving state information and warning information acoustically and visually, the output unit 300 may include a speaker 310 and a display 320 as illustrated in FIG. 1. In this case, the display 320 may be implemented as the same device as the user terminal 120 or may be implemented as an independent device separated from the user terminal 120.

Furthermore, the autonomous driving integrated controller 600 may transmit control information for driving control of a vehicle to a low-ranking control system 400, applied to a vehicle, through the vehicle control output interface 401 in the autonomous driving mode or manual driving mode of the vehicle. As illustrated in FIG. 1, the low-ranking control system 400 for driving control of a vehicle may include an engine control system 410, a braking control system 420 and a steering control system 430. The autonomous driving integrated controller 600 may transmit engine control information, braking control information and steering control information, as the control information, to the respective low-ranking control systems 410, 420 and 430 through the vehicle control output interface 401. Accordingly, the engine control system 410 may control the vehicle speed and acceleration of a vehicle by increasing or decreasing fuel supplied to an engine. The braking control system 420 may control the braking of the vehicle by controlling braking power of the vehicle. The steering control system 430 may control the steering of the vehicle through a steering apparatus (e.g., motor driven power steering (MDPS) system) applied to the vehicle.

As described above, the autonomous driving integrated controller 600 according to the present embodiment may obtain driving information based on a manipulation of a driver and traveling information indicative of a driving state of a vehicle through the driving information input interface 101 and the traveling information input interface 201, respectively, may transmit, to the output unit 300, driving state information and warning information, generated based on an autonomous driving algorithm processed by a processor 610 therein, through the passenger output interface 301, and may transmit, to the low-ranking control system 400, control information, generated based on the autonomous driving algorithm processed by the processor 610, through the vehicle control output interface 401 so that driving control of the vehicle is performed.

In order to guarantee stable autonomous driving of a vehicle, it is necessary to continuously monitor a driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a surrounding object of a vehicle, such as a surrounding vehicle, pedestrian, road or fixed facility (e.g., a signal light, a signpost, a traffic sign or a construction fence). The sensor unit 500 may include one or more of a LIDAR sensor 510, a radar sensor 520 and a camera sensor 530 in order to detect a surrounding object outside a vehicle, as illustrated in FIG. 1.

The LIDAR sensor 510 may transmit a laser signal to the periphery of a vehicle, and may detect a surrounding object outside the vehicle by receiving a signal reflected and returned from a corresponding object. The LIDAR sensor 510 may detect a surrounding object located within a set distance, set vertical field of view and set horizontal field of view, which are predefined depending on its specifications. The LIDAR sensor 510 may include a front LIDAR sensor 511, a top LIDAR sensor 512, and a rear LIDAR sensor 513 installed at the front, top and rear of a vehicle, respectively, but the installation location of each sensor and the number of sensors installed are not limited to a specific embodiment. A threshold for determining the validity of a laser signal reflected and returned from a corresponding object may be previously stored in a memory 620 of the autonomous driving integrated controller 600. The processor 610 of the autonomous driving integrated controller 600 may determine a location (including a distance to a corresponding object), speed and moving direction of the corresponding object using a method of measuring the time taken for a laser signal, transmitted through the LIDAR sensor 510, to be reflected and returned from the corresponding object.

The radar sensor 520 may radiate electromagnetic waves around a vehicle, and may detect a surrounding object outside the vehicle by receiving a signal reflected and returned from a corresponding object. The radar sensor 520 may detect a surrounding object within a set distance, set vertical field of view and set horizontal field of view, which are predefined depending on its specifications. The radar sensor 520 may include a front radar sensor 521, a left radar sensor 522, a right radar sensor 523 and a rear radar sensor 524 installed at the front, left, right and rear of a vehicle, respectively, but the installation location of each sensor and the number of sensors installed are not limited to a specific embodiment. The processor 610 of the autonomous driving integrated controller 600 may determine a location (including a distance to a corresponding object), speed and moving direction of the corresponding object using a method of analyzing power of electromagnetic waves transmitted and received through the radar sensor 520.

The camera sensor 530 may detect a surrounding object outside a vehicle by photographing the periphery of the vehicle, and may detect a surrounding object within a set distance, set vertical field of view and set horizontal field of view, which are predefined depending on its specifications. The camera sensor 530 may include a front camera sensor 531, a left camera sensor 532, a right camera sensor 533 and a rear camera sensor 534 installed at the front, left, right and rear of a vehicle, respectively, but the installation location of each sensor and the number of sensors installed are not limited to a specific embodiment. The processor 610 of the autonomous driving integrated controller 600 may determine a location (including a distance to a corresponding object), speed and moving direction of the corresponding object by applying predefined image processing to an image captured by the camera sensor 530. Furthermore, an internal camera sensor 535 for photographing the inside of a vehicle may be mounted at a given location (e.g., rear view mirror) within the vehicle. The processor 610 of the autonomous driving integrated controller 600 may monitor a behavior and state of a passenger based on an image captured by the internal camera sensor 535, and may output guidance or a warning to the passenger through the output unit 300.

As illustrated in FIG. 1, the sensor unit 500 may further include an ultrasonic sensor 540 in addition to the LIDAR sensor 510, the radar sensor 520 and the camera sensor 530, and may further adopt various types of sensors for detecting a surrounding object of a vehicle along with the sensors. FIG. 3 illustrates an example in which in order to help understanding of the present embodiment, the front LIDAR sensor 511 or the front radar sensor 521 has been installed at the front of a vehicle, the rear LIDAR sensor 513 or the rear radar sensor 524 has been installed at the rear of the vehicle, and the front camera sensor 531, the left camera sensor 532, the right camera sensor 533 and the rear camera sensor 534 have been installed at the front, left, right and rear of the vehicle, respectively. However, as described above, the installation location of each sensor and the number of sensors installed are not limited to a specific embodiment. FIG. 5 illustrates an example of a set distance and horizontal field of view within which the LIDAR sensor 510, the radar sensor 520 and the camera sensor 530 may detect a surrounding object ahead of the vehicle. FIG. 6 illustrates an example in which each sensor detects a surrounding object. FIG. 6 is merely an example of the detection of a surrounding object. A method of detecting a surrounding object is determined by the installation location of each sensor and the number of sensors installed. A surrounding vehicle and a surrounding object in the omni-directional area of an ego vehicle being autonomously driven may be detected depending on a configuration of the sensor unit 500.

Furthermore, in order to determine a state of a passenger within a vehicle, the sensor unit 500 may further include a microphone and bio sensor for detecting a voice and bio signal (e.g., heart rate, electrocardiogram, respiration, blood pressure, body temperature, electroencephalogram, hotoplethysmography (or pulse wave) and blood sugar) of the passenger. The bio sensor may include a heart rate sensor, an electrocardiogram sensor, a respiration sensor, a blood pressure sensor, a body temperature sensor, an electroencephalogram sensor, a photoplethysmography sensor and a blood sugar sensor.

FIG. 4 illustrates an example of an internal structure of a vehicle. An internal device whose state is controlled by a manipulation of a passenger, such as a driver or fellow passenger of a vehicle, and which supports driving or convenience (e.g., rest or entertainment activities) of the passenger may be installed within the vehicle. Such an internal device may include a vehicle seat S in which a passenger is seated, a lighting device L such as an internal light and a mood lamp, the user terminal 120, the display 320, and an internal table. The state of the internal device may be controlled by the processor 610.

The angle of the vehicle seat S may be adjusted by the processor 610 (or by a manual manipulation of a passenger). If the vehicle seat S is configured with a front row seat S1 and a back row seat S2, only the angle of the front row seat S1 may be adjusted. If the back row seat S2 is not provided and the front row seat S1 is divided into a seat structure and a footstool structure, the front row seat S1 may be implemented so that the seat structure of the front row seat S1 is physically separated from the footstool structure and the angle of the front row seat S1 is adjusted. Furthermore, an actuator (e.g., motor) for adjusting the angle of the vehicle seat S may be provided. The on and off of the lighting device L may be controlled by the processor 610 (or by a manual manipulation of a passenger). If the lighting device L includes a plurality of lighting units such as an internal light and a mood lamp, the on and off of each of the lighting units may be independently controlled. The angle of the user terminal 120 or the display 320 may be adjusted by the processor 610 (or by a manual manipulation of a passenger) based on an angle of field of a passenger. For example, the angle of the user terminal 120 or the display 320 may be adjusted so that a screen thereof is placed in a passenger's gaze direction. In this case, an actuator (e.g., motor) for adjusting the angle of the user terminal 120 and the display 320 may be provided.

As illustrated in FIG. 1, the autonomous driving integrated controller 600 may communicate with a server 700 over a network. Various communication methods, such as a wide area network (WAN), a local area network (LAN) or a personal area network (PAN), may be adopted as a network method between the autonomous driving integrated controller 600 and the server 700. Furthermore, in order to secure wide network coverage, a low power wide area network (LPWAN, including commercialized technologies such as LoRa, Sigfox, Ingenu, LTE-M and NB-IOT, that is, networks having very wide coverage, among the IoT) communication method may be adopted. For example, a LoRa (capable of low power communication and also having wide coverage of a maximum of about 20 Km) or Sigfox (having coverage of 10 Km (downtown) to 30 Km (in the outskirt area outside the downtown area) according to environments) communication method may be adopted. Furthermore, LTE network technologies based on $3^{rd}$ generation partnership project (3GPP) Release 12, 13, such as machine-type communications (LTE-MTC) (or LTE-M), narrowband (NB) LTE-M, and NB IoT having a power saving mode (PSM), may be adopted. The server 700 may provide the latest map information (may correspond to various types of map information, such as two-dimensional (2-D) navigation map data, three-dimensional (3-D) manifold map data or 3-D high-precision electronic map data). Furthermore, the server 700 may provide various types of information, such as accident information, road control information, traffic volume information and weather information in a road. The autonomous driving integrated controller 600 may update map information, stored in the memory 620, by receiving the latest map information from the server 700, may receive accident information, road control information, traffic volume information and weather information, and may use the information for autonomous driving control of a vehicle.

The structure and functions of the autonomous driving integrated controller 600 according to the present embodiment are described with reference to FIG. 2. As illustrated in FIG. 2, the autonomous driving integrated controller 600 may include the processor 610 and the memory 620.

The memory 620 may store basic information necessary for autonomous driving control of a vehicle or may store information generated in an autonomous driving process of a vehicle controlled by the processor 610. The processor 610 may access (or read) information stored in the memory 620, and may control autonomous driving of a vehicle. The memory 620 may be implemented as a computer-readable recording medium, and may operate in such a way to be accessed by the processor 610. Specifically, the memory 620 may be implemented as a hard drive, a magnetic tape, a memory card, a read-only memory (ROM), a random access memory (RAM), a digital video disc (DVD) or an optical data storage, such as an optical disk.

The memory 620 may store map information that is required for autonomous driving control by the processor 610. The map information stored in the memory 620 may be a navigation map (or a digital map) that provides information of a road unit, but may be implemented as a precise road map that provides road information of a lane unit, that is, 3-D high-precision electronic map data, in order to improve the precision of autonomous driving control. Accordingly, the map information stored in the memory 620 may provide dynamic and static information necessary for autonomous driving control of a vehicle, such as a lane, the center line of a lane, an enforcement lane, a road boundary, the center line of a road, a traffic sign, a road mark, the shape and height of a road, and a lane width.

Furthermore, the memory 620 may store the autonomous driving algorithm for autonomous driving control of a vehicle. The autonomous driving algorithm is an algorithm (recognition, determination and control algorithm) for recognizing the periphery of an autonomous vehicle, determining the state of the periphery thereof, and controlling the driving of the vehicle based on a result of the determination. The processor 610 may perform active autonomous driving control for a surrounding environment of a vehicle by executing the autonomous driving algorithm stored in the memory 620.

The processor 610 may control autonomous driving of a vehicle based on the driving information and the traveling information received from the driving information input interface 101 and the traveling information input interface 201, respectively, the information on a surrounding object detected by the sensor unit 500, and the map information and the autonomous driving algorithm stored in the memory 620. The processor 610 may be implemented as an embedded processor, such as a complex instruction set computer (CICS) or a reduced instruction set computer (RISC), or a dedicated semiconductor circuit, such as an application-specific integrated circuit (ASIC).

In the present embodiment, the processor 610 may control autonomous driving of an ego vehicle being autonomously driven by analyzing the driving trajectory of each of the ego vehicle being autonomously driven and a surrounding vehicle. To this end, the processor 610 may include a sensor processing module 611, a driving trajectory generation module 612, a driving trajectory analysis module 613, a driving control module 614, a passenger state determination module 616 and a trajectory learning module 615, as illustrated in FIG. 2. FIG. 2 illustrates each of the modules as an independent block based on its function, but the modules may be integrated into a single module and implemented as an element for integrating and performing the functions of the modules.

The sensor processing module 611 may determine traveling information of a surrounding vehicle (i.e., includes the location of the surrounding vehicle, and may further include the speed and moving direction of the surrounding vehicle along the location) based on a result of detecting, by the sensor unit 500, the surrounding vehicle around an ego vehicle being autonomously driven. That is, the sensor processing module 611 may determine the location of a surrounding vehicle based on a signal received through the LIDAR sensor 510, may determine the location of a surrounding vehicle based on a signal received through the radar sensor 520, may determine the location of a surrounding vehicle based on an image captured by the camera sensor 530, and may determine the location of a surrounding vehicle based on a signal received through the ultrasonic sensor 540. To this end, as illustrated in FIG. 1, the sensor processing module 611 may include a LIDAR signal processing module 611a, a radar signal processing module 611b and a camera signal processing module 611c. In some embodiments, an ultrasonic signal processing module (not illustrated) may be further added to the sensor processing module 611. An implementation method of the method of determining the location of a surrounding vehicle using the LIDAR sensor 510, the radar sensor 520 and the camera sensor 530 is not limited to a specific embodiment. Furthermore, the sensor processing module 611 may determine attribute information, such as the size and type of a surrounding vehicle, in addition to the location, speed and moving direction of the surrounding vehicle. An algorithm for determining information, such as the location, speed, moving direction, size and type of a surrounding vehicle, may be predefined.

The driving trajectory generation module 612 may generate an actual driving trajectory and expected driving trajectory of a surrounding vehicle and an actual driving trajectory of an ego vehicle being autonomously driven. To this end, as illustrated in FIG. 2, the driving trajectory generation module 612 may include a surrounding vehicle driving trajectory generation module 612a and a ego vehicle driving trajectory generation module 612b.

First, the surrounding vehicle driving trajectory generation module 612a may generate an actual driving trajectory of a surrounding vehicle.

Specifically, the surrounding vehicle driving trajectory generation module 612a may generate an actual driving trajectory of a surrounding vehicle based on traveling information of the surrounding vehicle detected by the sensor unit 500 (i.e., the location of the surrounding vehicle determined by the sensor processing module 611). In this case, in order to generate the actual driving trajectory of the surrounding vehicle, the surrounding vehicle driving trajectory generation module 612a may refer to map information stored in the memory 620, and may generate the actual driving trajectory of the surrounding vehicle by making cross reference to the location of the surrounding vehicle detected by the sensor unit 500 and a given location in the map information stored in the memory 620. For example, when a surrounding vehicle is detected at a specific point by the sensor unit 500, the surrounding vehicle driving trajectory generation module 612a may specify a currently detected location of the surrounding vehicle in map information stored in the memory 620 by making cross reference to the detected location of the surrounding vehicle and a given location in the map information. The surrounding vehicle driving trajectory generation module 612a may generate an actual driving trajectory of a surrounding vehicle by continuously monitoring the location of the surrounding vehicle as described above. That is, the surrounding vehicle driving trajectory generation module 612a may generate an actual driving trajectory of a surrounding vehicle by mapping the location of the surrounding vehicle, detected by the sensor unit 500, to a location in map information, stored in the memory 620, based on the cross reference and accumulating the location.

An actual driving trajectory of a surrounding vehicle may be compared with an expected driving trajectory of the surrounding vehicle to be described later to be used to determine whether map information stored in the memory 620 is accurate. In this case, if an actual driving trajectory of a specific surrounding vehicle is compared with an expected driving trajectory, there may be a problem in that it is erroneously determined that map information stored in the memory 620 is inaccurate although the map information is accurate. For example, if actual driving trajectories and expected driving trajectories of multiple surrounding vehicles are the same and an actual driving trajectory and expected driving trajectory of a specific surrounding vehicle are different, when only the actual driving trajectory of the specific surrounding vehicle is compared with the expected driving trajectory, it may be erroneously determined that map information stored in the memory 620 is inaccurate although the map information is accurate. In order to prevent this problem, it is necessary to determine whether the tendency of actual driving trajectories of a plurality of surrounding vehicles gets out of an expected driving trajectory. To this end, the surrounding vehicle driving trajectory generation module 612a may generate the actual driving trajectory of each of the plurality of surrounding vehicles. Furthermore, if it is considered that a driver of a surrounding vehicle tends to slightly move a steering wheel left and right during his or her driving process for the purpose of straight-line path driving, an actual driving trajectory of the surrounding vehicle may be generated in a curved form, not a straight-line form. In order to compute an error between expected driving trajectories to be described later, the surrounding vehicle driving trajectory generation module 612a may generate an actual driving trajectory of a straight-line form by applying a given smoothing scheme to the original actual driving trajectory generated in a curved form. Various schemes, such as interpolation for each location of a surrounding vehicle, may be adopted as the smoothing scheme.

Furthermore, the surrounding vehicle driving trajectory generation module 612a may generate an expected driving trajectory of a surrounding vehicle based on map information stored in the memory 620.

As described above, the map information stored in the memory 620 may be 3-D high-precision electronic map data. Accordingly, the map information may provide dynamic and static information necessary for autonomous driving control of a vehicle, such as a lane, the center line of a lane, an enforcement lane, a road boundary, the center line of a road, a traffic sign, a road mark, a shape and height of a road, and a lane width. If it is considered that a vehicle commonly travels in the middle of a lane, it may be expected that a surrounding vehicle that travels around an ego vehicle being autonomously driven will also travel in the middle of a lane. Accordingly, the surrounding vehicle driving trajectory generation module 612a may generate an expected driving trajectory of the surrounding vehicle as the center line of a road incorporated into map information.

The ego vehicle driving trajectory generation module 612b may generate an actual driving trajectory of an ego vehicle being autonomously driven that has been driven so far based on the traveling information of the ego vehicle being autonomously driven obtained through the traveling information input interface 201.

Specifically, the ego vehicle driving trajectory generation module 612b may generate an actual driving trajectory of an ego vehicle being autonomously driven by making cross reference to a location of the ego vehicle being autonomously driven obtained through the traveling information input interface 201 (i.e., information on the location of the ego vehicle being autonomously driven obtained by the GPS receiver 260) and a given location in map information stored in the memory 620. For example, the ego vehicle driving trajectory generation module 612b may specify a current location of an ego vehicle being autonomously driven, in map information, stored in the memory 620, by making cross reference to a location of the ego vehicle being autonomously driven obtained through the traveling information input interface 201 and a given location in the map information. As described above, the ego vehicle driving trajectory generation module 612b may generate an actual driving trajectory of the ego vehicle being autonomously driven by continuously monitoring the location of the ego vehicle being autonomously driven. That is, the ego vehicle driving trajectory generation module 612b may generate the actual driving trajectory of the ego vehicle being autonomously driven by mapping the location of the ego vehicle being autonomously driven, obtained through the traveling information input interface 201, to a location in the map information stored in the memory 620, based on the cross reference and accumulating the location.

Furthermore, the ego vehicle driving trajectory generation module 612b may generate an expected driving trajectory up to the destination of an ego vehicle being autonomously driven based on map information stored in the memory 620.

That is, the ego vehicle driving trajectory generation module 612b may generate the expected driving trajectory up to the destination using a current location of the ego vehicle being autonomously driven obtained through the traveling information input interface 201 (i.e., information on the current location of the ego vehicle being autonomously driven obtained through the GPS receiver 260) and the map information stored in the memory 620. Like the expected driving trajectory of the surrounding vehicle, the expected driving trajectory of the ego vehicle being autonomously driven may be generated as the center line of a road incorporated into the map information stored in the memory 620.

The driving trajectories generated by the surrounding vehicle driving trajectory generation module 612a and the ego vehicle driving trajectory generation module 612b may be stored in the memory 620, and may be used for various purposes in a process of controlling, by the processor 610, autonomous driving of an ego vehicle being autonomously driven.

The driving trajectory analysis module 613 may diagnose current reliability of autonomous driving control for an ego vehicle being autonomously driven by analyzing driving trajectories (i.e., an actual driving trajectory and expected driving trajectory of a surrounding vehicle and an actual driving trajectory of the ego vehicle being autonomously driven) that are generated by the driving trajectory generation module 612 and stored in the memory 620. The diagnosis of the reliability of autonomous driving control may be performed in a process of analyzing a trajectory error between the actual driving trajectory and expected driving trajectory of the surrounding vehicle.

The driving control module 614 may perform a function for controlling autonomous driving of an ego vehicle being autonomously driven. Specifically, the driving control module 614 may process the autonomous driving algorithm synthetically using the driving information and the traveling information received through the driving information input interface 101 and the traveling information input interface 201, respectively, the information on a surrounding object detected by the sensor unit 500, and the map information stored in the memory 620, may transmit the control information to the low-ranking control system 400 through the vehicle control output interface 401 so that the low-ranking control system 400 controls autonomous driving of an ego vehicle being autonomously driven, and may transmit the driving state information and warning information of the ego vehicle being autonomously driven to the output unit 300 through the passenger output interface 301 so that a driver can recognize the driving state information and warning information. Furthermore, when integrating and controlling such autonomous driving, the driving control module 614 controls the autonomous driving by taking into consideration the driving trajectories of an ego vehicle being autonomously driven and a surrounding vehicle, which have been analyzed by the sensor processing module 611, the driving trajectory generation module 612 and the driving trajectory analysis module 613, thereby improving the precision of autonomous driving control and enhancing the safety of autonomous driving control.

The trajectory learning module 615 may perform learning or corrections on an actual driving trajectory of an ego vehicle being autonomously driven generated by the ego vehicle driving trajectory generation module 612b. For example, when a trajectory error between an actual driving trajectory and expected driving trajectory of a surrounding vehicle is a preset threshold or more, the trajectory learning module 615 may determine that an actual driving trajectory of an ego vehicle being autonomously driven needs to be corrected by determining that map information stored in the memory 620 is inaccurate. Accordingly, the trajectory learning module 615 may determine a lateral shift value for correcting the actual driving trajectory of the ego vehicle being autonomously driven, and may correct the driving trajectory of the ego vehicle being autonomously driven.

The passenger state determination module 616 may determine a state and behavior of a passenger based on a state and bio signal of the passenger detected by the internal camera sensor 535 and the bio sensor. The state of the passenger determined by the passenger state determination module 616 may be used for autonomous driving control of an ego vehicle being autonomously driven or in a process of outputting a warning to the passenger.

Hereinafter, an embodiment in which trajectory-based control over autonomous driving based on a driving trajectory correction and group following control for following the driving of a platooning group are interchangeably performed based on driving trajectory correction, for each given section in a path of an ego vehicle from a current location to a destination, is described based on the aforementioned contents.

The processor 610 according to the present embodiment may control the autonomous driving of an ego vehicle based on a driving trajectory generated by the ego vehicle driving trajectory generation module 612 based on map information stored in the memory 620. Specifically, the processor 610 may determine whether it is necessary to correct the driving trajectory of the ego vehicle, based on a result of the detection of a surrounding vehicle around the ego vehicle by the sensor unit 500, may correct the driving trajectory based on a result of the determination, and may control the autonomous driving of the ego vehicle. In the present embodiment, autonomous driving control based on the correction of a driving trajectory is defined as trajectory-based control.

Trajectory-based control is specifically described. As described above, (the driving trajectory generation module 612 of) the processor 610 according to the present embodiment may generate an actual driving trajectory of the surrounding vehicle based on driving information of the surrounding vehicle detected by the sensor unit 500. That is, when a surrounding vehicle is detected at a specific point by the sensor unit 500, the processor 610 may specify the location of the currently detected surrounding vehicle in map information stored in the memory 620, by making cross reference to the location of the detected surrounding vehicle and a location of the surrounding vehicle in the map information. As described above, the processor 610 may generate an actual driving trajectory of the surrounding vehicle by continuously monitoring the location of the surrounding vehicle.

Furthermore, (the driving trajectory generation module 612 of) the processor 610 may generate an expected driving trajectory of the surrounding vehicle based on the map information stored in the memory 620. In this case, the processor 610 may generate the expected driving trajectory of the surrounding vehicle as the centerline of a lane incorporated into the map information.

Furthermore, (the driving trajectory generation module 612 of) the processor 610 may generate an expected driving trajectory of an ego vehicle based on the map information stored in the memory 620. In this case, the processor 610 may generate the expected driving trajectory of the ego vehicle as the centerline of a lane incorporated into the map information.

After the actual driving trajectory and expected driving trajectory of the surrounding vehicle and the expected driving trajectory of the ego vehicle are generated, (the trajectory training module 615 of) the processor 610 may determine whether it is necessary to correct the expected driving trajectory of the ego vehicle, based on a comparison between the actual driving trajectory and expected driving trajectory of the surrounding vehicle. Specifically, when a trajectory error between the actual driving trajectory and expected driving trajectory of the surrounding vehicle is a preset threshold value or more, the processor 610 may determine that it is necessary to correct the expected driving trajectory of the ego vehicle. That is, as described above, when the trajectory error between the actual driving trajectory and expected driving trajectory of the surrounding vehicle is the threshold value or more, the processor 610 may determine that the map information stored in the memory 620 is inaccurate. Accordingly, the processor 610 needs to correct the expected driving trajectory of the ego vehicle generated based on the map information stored in the memory 620. In this case, the processor 610 may correct the expected driving trajectory of the ego vehicle based on a result of a comparison between the actual driving trajectory and expected driving trajectory of the surrounding vehicle. For example, the processor 610 may correct the expected driving trajectory of the ego vehicle by shifting the expected driving trajectory of the ego vehicle to the left or right by a difference between the actual driving trajectory and expected driving trajectory of the surrounding vehicle. Accordingly, the processor 610 may perform trajectory-based control over the autonomous driving of the ego vehicle based on the corrected expected driving trajectory.

If a driving path of an ego vehicle up to a destination (hereinafter referred to as a "first driving path") overlaps a driving path of a platooning group configured with a plurality of group vehicles (hereinafter referred to as a "second driving path"), the processor 610 may control the autonomous driving of the ego vehicle to follow the driving of the platooning group. In the present embodiment, control for following the platooning group is defined as group following control. A platooning group means a group that is configured with a plurality of group vehicles including one leader vehicle and one or more follower vehicles and in which the plurality of group vehicles share driving information using a communication method between the vehicles and travel on a road while taking an external environment into consideration. If a plurality of platooning groups is present in vehicle to everything (V2X) or vehicle to vehicle (V2V) communication coverage of an ego vehicle, the processor 610 may receive information on each of the platooning groups (e.g., information on the specifications of a leader vehicle in each platooning group or mileage of each platooning group) from the leader vehicle of each of the platooning groups, and may provide the information to a passenger of the ego vehicle by outputting the information through the user terminal 120. The passenger may select a platooning group that the ego vehicle intends to follow, by checking the information on each of the platooning groups. If a platooning group is not present in V2X or V2V communication coverage of the ego vehicle, the processor 610 may receive information on each of platooning groups from an external separate server.

If the group following control is performed, the processor 610 may perform the group following control from a joining point, at which an overlap between the first driving path of the ego vehicle and the second driving path of the platooning group is initiated, to a breakaway point, at which the overlap between the first driving path and the second driving path is terminated. That is, the processor 610 may perform group following control, not trajectory-based control, in an overlap section between the driving path of the ego vehicle and the driving path of the platooning group. At this time, the processor 610 may determine the joining point and breakaway point for performing the group following control among a plurality of candidate joining points and a plurality of candidate breakaway points, before performing the group following control. This configuration is described below.

In the present embodiment, the processor 610 may interchangeably perform trajectory-based control and group following control based on whether a predefined control changeover condition is satisfied. The control changeover condition may include a group following control changeover condition for a change from trajectory-based control to group following control and a trajectory-based control changeover condition for a change from group following control to trajectory-based control. That is, the processor 610 interchangeably performs trajectory-based control and group following control based on whether the control changeover condition according to the driving environment of an ego vehicle is satisfied. Accordingly, a computational load of autonomous driving control by an ego vehicle can be reduced, the intervention of a passenger in driving control over the ego vehicle in a process of reaching up to a destination can be minimized to improve convenience of the passenger, and the ego vehicle can reach the destination within the shortest time.

A configuration in which trajectory-based control and group following control are interchanged based on whether a control changeover condition is satisfied is described. The processor 610 may first perform trajectory-based control using a current location of an ego vehicle as a starting point. When the ego vehicle reaches a joining point in a process of performing the trajectory-based control from the current location of the ego vehicle, the processor 610 may determine that a group following control changeover condition is satisfied, and perform group following control.

That is, the processor 610 may perform the trajectory-based control from the current location of the ego vehicle to the joining point. When the ego vehicle reaches the joining point, the processor 610 may change control over the ego vehicle from the trajectory-based control to the group following control. The processor 610 may output an alarm through the output unit 300 before the ego vehicle reaches the joining point (e.g., before 1 km), so that a passenger recognizes joining to a platooning group. When the trajectory-based control is changed to the group following control, the processor 610 may transmit a platooning group joining request to a leader vehicle of the platooning group. When receiving the approval of the leader vehicle, the ego vehicle may join the platooning group at a given location within the platooning group without deranging a formation of the platooning group.

When the ego vehicle reaches a breakaway point in a process of performing the group following control from the joining point, the processor 610 may determine that the trajectory-based control changeover condition has been satisfied, and perform trajectory-based control.

That is, the processor 610 may perform the group following control from the joining point to the breakaway point. When the ego vehicle reaches the breakaway point, the processor 610 may change control over the ego vehicle from the group following control to the trajectory-based control again. The processor 610 may output an alarm through the output unit 300 before the ego vehicle reaches the breakaway point (e.g., before 1 km), so that the passenger recognizes breakaway from the platooning group.

As described above, the processor 610 may determine a joining point and a breakaway point among a plurality of candidate joining points and a plurality of candidate breakaway points. In the present embodiment, the processor 610 may determine a joining point and a breakaway point based on the time taken for an ego vehicle to reach from a current location to a destination.

Specifically, the processor 610 may determine, as a joining point and breakaway point, a candidate joining point and candidate breakaway point, respectively, at which a total time required is a minimum, the total time required indicating the sum of the time taken for an ego vehicle to reach from a current location to the candidate joining point based on trajectory-based control, the time taken for the ego vehicle to reach from the candidate joining point to the candidate breakaway point based on group following control, and the time taken for the ego vehicle to reach the candidate breakaway point to a destination based on the trajectory-based control.

That is, the processor 610 may identify a plurality of candidate joining points at which an overlap between first and second driving paths is initiated, and may identify a plurality of candidate breakaway points at which the overlap between the first and second driving paths is terminated. The processor 610 may determine, as the joining point and breakaway point, a candidate joining point and candidate breakaway point, respectively, at which a total time required to reach the destination is a minimum, among the plurality of candidate joining points and candidate breakaway point identified as described above. Furthermore, when determining the joining point and the breakaway point, the processor 610 may further take into consideration joining and breakaway easiness, such as a degree of congestion or a degree of accident risk in each of the candidate joining point and candidate breakaway point.

The configuration in which trajectory-based control and group following control are interchangeably performed at the level of an ego vehicle has been described above. The present embodiment proposes a configuration for reducing a total of resources of a system necessary to detect a surrounding object at the level of a platooning group that performs platooning along with the aforementioned configuration.

Specifically, when an ego vehicle joins a platooning group and performs group following control, the processor 610 may change a surrounding object detection area of the sensor unit 500 based on a relative location of the ego vehicle for a group vehicle belonging to the platooning group.

That is, a plurality of group vehicles belonging to a platooning group travel under the same driving environment. Accordingly, a method of separating a surrounding object detection area based on the location of each of the group vehicles within the platooning group, detecting a surrounding object only in the corresponding surrounding object detection area, and sharing the results of the detection among the group vehicles rather than a method of detecting, by all the group vehicles, all surrounding objects through sensing units mounted on the group vehicles may be more efficient in terms of a reduction in the system resource of each of the group vehicles. In order to separate a surrounding object detection area at the level of a platooning group, the processor 610 according to the present embodiment may operate to change a surrounding object detection area of the sensor unit 500 based on a relative location of an ego vehicle for a group vehicle belonging to a platooning group.

In order to implement a function for changing a surrounding object detection area of the sensor unit 500 based on a relative location of an ego vehicle within a platooning group, when performing group following control, the processor 610 may divide a platooning group into a preceding driving group, a middle driving group and a following driving group using a predefined group classification algorithm, may determine a driving group to which the ego vehicle belongs among the driving groups, and may change a surrounding object detection area of the sensor unit 500 based on a result of the determination. The group classification algorithm for dividing a platooning group into a preceding driving group, a middle driving group and a following driving group may be implemented using various design methods. For example, the group classification algorithm may be implemented by an algorithm for identifying the location of a leader vehicle and the location of the rearmost vehicle through V2V communication between group vehicles, calculating the length of a platooning group in a longitudinal direction (i.e., driving direction) based on the identified locations, and dividing a platooning group into a plurality of driving groups based on the calculated length in the longitudinal direction.

After the platooning group is divided into the plurality of driving groups, the processor 610 may determine a driving group to which the ego vehicle belongs among the driving groups, and may change a surrounding object detection area of the sensor unit 500 based on a result of the determination. Specifically, if the ego vehicle belongs to the preceding driving group, the processor 610 may detect a surrounding object ahead of the ego vehicle (the term "ahead" is defined to include the front cross side) through the sensor unit 500 (i.e., may change the surrounding object detection area of the sensor unit 500 to a front area). If the ego vehicle belongs to the middle driving group, the processor 610 may detect a surrounding object on the either side of the ego vehicle through the sensor unit 500 (i.e., may change the surrounding object detection area of the sensor unit 500 to side areas). If the ego vehicle belongs to the following driving group, the processor 610 may detect a surrounding object in the rear of the ego vehicle (the term "rear" is defined to include the rear cross side) through the sensor unit 500 (i.e., may change the surrounding object detection area of the sensor unit 500 to a rear area).

When the surrounding object detection area of the sensor unit 500 is changed to the front area, sensors (i.e., the front lidar sensor 511, the front radar sensor 521 and the front camera sensor 531) for detecting the front area may be essentially activated, and the other sensors may be selectively activated depending on driving environments. When the surrounding object detection area of the sensor unit 500 is changed to the side areas, sensors (i.e., the left radar sensor 522, the right radar sensor 522, the left camera sensor 532, and the right camera sensor 533) for detecting the side areas may be essentially activated, and the other sensors may be selectively activated depending on driving environments. When the surrounding object detection area of the sensor unit 500 is changed to the rear area, sensors (i.e., the rear lidar sensor 513, the rear radar sensor 524, and the rear camera sensor 534) for detecting the rear area may be essentially activated, and the other sensors may be selectively activated depending on driving environments.

Figure 7:
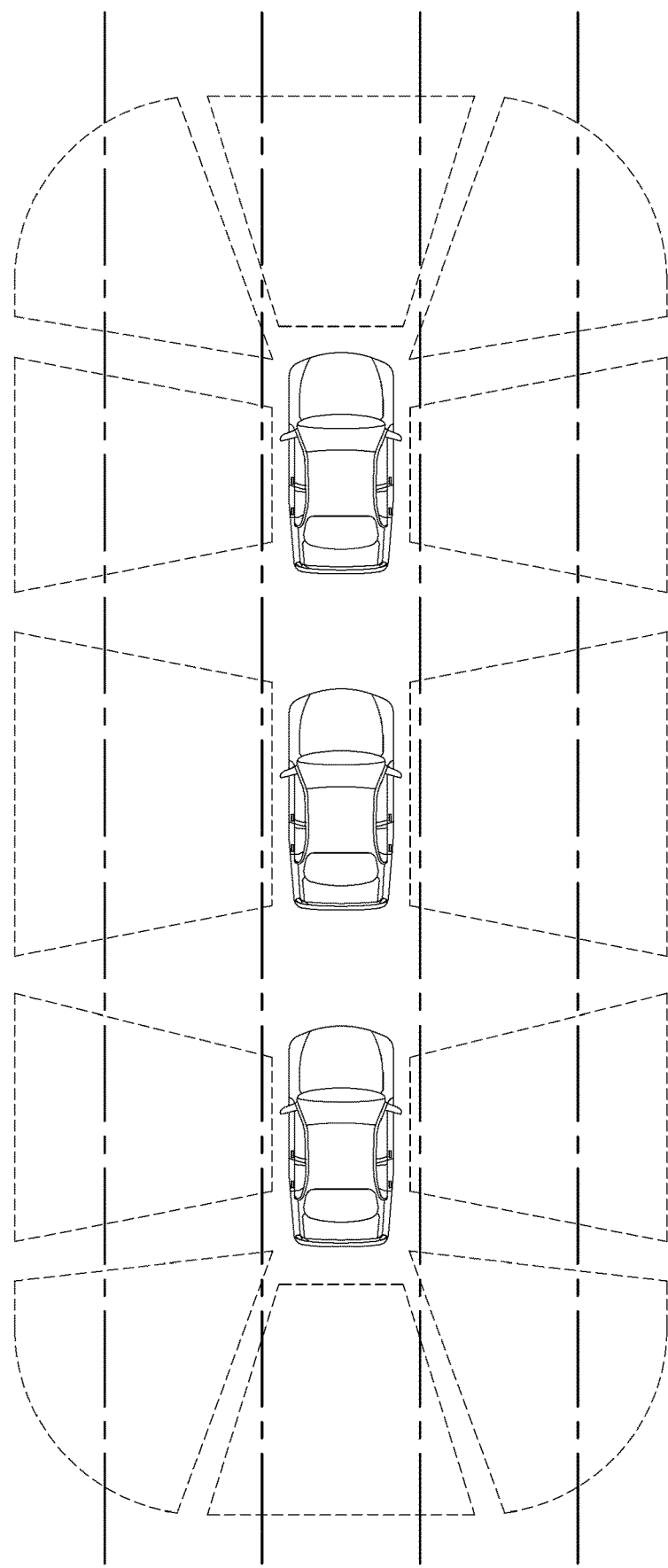
FIG. 7 is an exemplary diagram illustrating an example in which the surrounding object detection area of a sensor unit is changed based on the location of an ego vehicle within a platooning group in the autonomous driving apparatus according to an exemplary embodiment of the present invention.

Furthermore, as illustrated in FIG. 7, when a case where a plurality of group vehicles perform platooning in one lane is taken into consideration, only a leader vehicle and the rearmost vehicle correspond to the preceding driving group and the following driving group, respectively. Group vehicles located between the leader vehicle and the rearmost vehicle may correspond to the middle driving group. The group classification algorithm for dividing a platooning group into the preceding driving group, the middle driving group and the following driving group may be pre-defined by a designer. In the example of FIG. 7, a surrounding object detection area of the sensor unit 500 of an ego vehicle includes a front area and side areas when the ego vehicle belongs to the preceding driving group (i.e., when the ego vehicle is the leader vehicle), includes side areas when the ego vehicle belongs to the middle driving group, and includes a rear area and side areas when the ego vehicle belongs to the following driving group (i.e., when the ego vehicle is the rearmost vehicle).

If such a function of the processor 610 is applied to each of group vehicles belonging to a platooning group, each of the group vehicles operates to change a surrounding object detection area of the sensor unit mounted on each group vehicle, based on its location within the platooning group. Accordingly, a group vehicle belonging to a preceding driving group detects a surrounding object ahead of the platooning group. A group vehicle belonging to a middle driving group detects a surrounding object on either side of the platooning group. A group vehicle belonging to a following driving group detects a surrounding object in the rear of the platooning group. Accordingly, a total of resources of a system necessary to detect a surrounding object can be significantly reduced at the level of a platooning group because the detection of a surrounding object on the front side, left and right sides, and rear side of the platooning group is dividedly performed by group vehicles belonging to the platooning group.

When performing group following control, the processor 610 may control a sensing parameter of the sensor unit 500 to have a value mutually dependent on a sensing parameter of a sensing unit mounted on each of group vehicles, in addition to the operation of changing a surrounding object detection area of the sensor unit 500, based on a relative location of an ego vehicle within a platooning group. In this case, the sensing parameter may be defined to include one or more of a field of view (FOV) and sensor output of a sensor.

A mutually dependent relation between a sensing parameter of the sensor unit 500 of an ego vehicle and a sensing parameter of the sensing unit of each of group vehicles functions as means for optimizing a detection area and detection performance for a surrounding object at the level of a platooning group. Specifically, a surrounding object detection area of the sensor unit 500 of an ego vehicle and a surrounding object detection area of the sensing unit of another group vehicle may overlap because the ego vehicle and the another group vehicle form a single platooning group and travel. In contrast, although an ego vehicle and another group vehicle form a single platooning group and travel, if the distance between the ego vehicle and the another group vehicle is long, there may exist a blind spot in which a surrounding object cannot be detected by the sensor unit 500 of the ego vehicle and the sensing unit of the another group vehicle. If the surrounding object detection areas of the sensor unit 500 of the ego vehicle and the sensing unit of the another group vehicle overlap as described above, unnecessary power and resources are consumed at the level of the platooning group. Accordingly, in order to remove such unnecessary power and resources, it is necessary to minimize the overlap range of the FOVs of the sensor unit 500 of the ego vehicle and the sensing unit of the another group vehicle. Furthermore, even when a blind spot is present as described above, it is necessary to extend one or more of the FOVs of the sensor unit 500 of the ego vehicle and the sensing unit of the another group vehicle, in order to remove the blind spot.

Furthermore, detection importance for a surrounding object may be changed depending on driving environments. For example, in a driving environment in which many vehicles are present around a platooning group or complexity and a degree of risk are high like a point at which an accident frequently occurs, detection importance for a surrounding object may be said to be high. In contrast, in a driving environment in which a degree of risk of an accident is low because the number of other vehicles is small around a platooning group and fixed facilities, such as guardrails or median strips, are consecutively present, detection importance for a surrounding object may be said to be relatively low. If a surrounding object is detected based on only constant sensor output without taking into consideration detection importance for the surrounding object according to such a driving environment, the detection of a surrounding object having high importance may be omitted and a surrounding object having low importance may be detected based on high sensor output, thereby causing unnecessary power consumption of a vehicle.

In order to solve the problems, the processor 610 according to the present embodiment may control a sensing parameter of the sensor unit 500, that is, one or more of the FOV and sensor output of the sensor unit 500, so that the sensing parameter of the sensor unit 500 has a value mutually dependent on a sensing parameter of a sensing unit mounted on each of group vehicles. At this time, the processor 610 may control the sensing parameter of the sensor unit 500 in response to a sensor control signal transmitted by the leader vehicle of a platooning group. The sensor control signal may be defined as a signal generated for each of the group vehicles and transmitted to each of the group vehicles by the leader vehicle, based on a driving environment of the platooning group and the location of each of the group vehicles within the platooning group, so that a detection area and detection performance for a surrounding object can be optimized at the level of the platooning group.

From the viewpoint of a leader vehicle, a driving environment of a platooning group (e.g., whether many other vehicles are present around the platooning group or whether a currently traveling point corresponds to a point at which an accident frequently occurs) may be confirmed through a sensing unit mounted on the leader vehicle or a navigation terminal communicating with an external server. Furthermore, the location of each of group vehicles may be identified through V2V communication. Accordingly, the leader vehicle may generate, for each group vehicle, a sensor control signal for optimizing a detection area and detection performance for a surrounding object at the level of the platooning group. Each of the group vehicles may receive, from the leader vehicle, the sensor control signal assigned thereto, and may control one or more of the FOV and sensor output of a sensing unit mounted thereon. Likewise, an ego vehicle may receive, from the leader vehicle, the sensor control signal assigned thereto, and may control one or more of the FOV and the sensor output of the sensor unit 500.

If an ego vehicle has the position of a leader vehicle in a platooning group, the aforementioned operation of the leader vehicle may be performed by the ego vehicle. That is, the ego vehicle may generate a sensor control signal for each group vehicle, belonging to the platooning group, based on the results of the detection of a surrounding object by the sensor unit 500 and the location of each of the group vehicles within the platooning group, and may transmit the sensor control signal to each of the group vehicles.

Furthermore, the configuration in which a surrounding object detection area of the sensor unit 500 is changed based on a relative location of an ego vehicle within a platooning group and the configuration in which a sensing parameter of the sensor unit 500 is controlled in response to a sensor control signal may be complementarily combined and configured. That is, an embodiment may be implemented, in which a sensing parameter of the sensor unit 500 is controlled in response to a sensor control signal, transmitted by a leader vehicle, in the state in which a surrounding object detection area of the sensor unit 500 has been changed based on a relative location of an ego vehicle for a group vehicle belonging to a platooning group. Accordingly, at the level of the platooning group, a detection area and detection performance for the surrounding object can be maximized.

Figure 8:
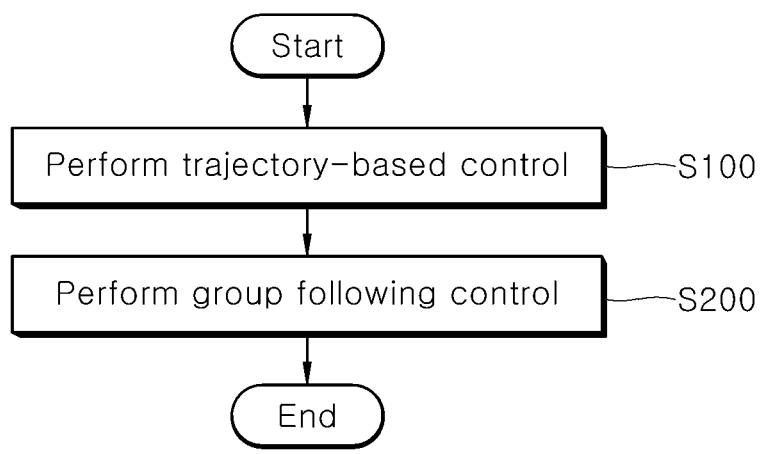
FIGS. 8 and 9 are flowcharts for describing an autonomous driving method according to an exemplary embodiment of the present invention.
Figure 9:
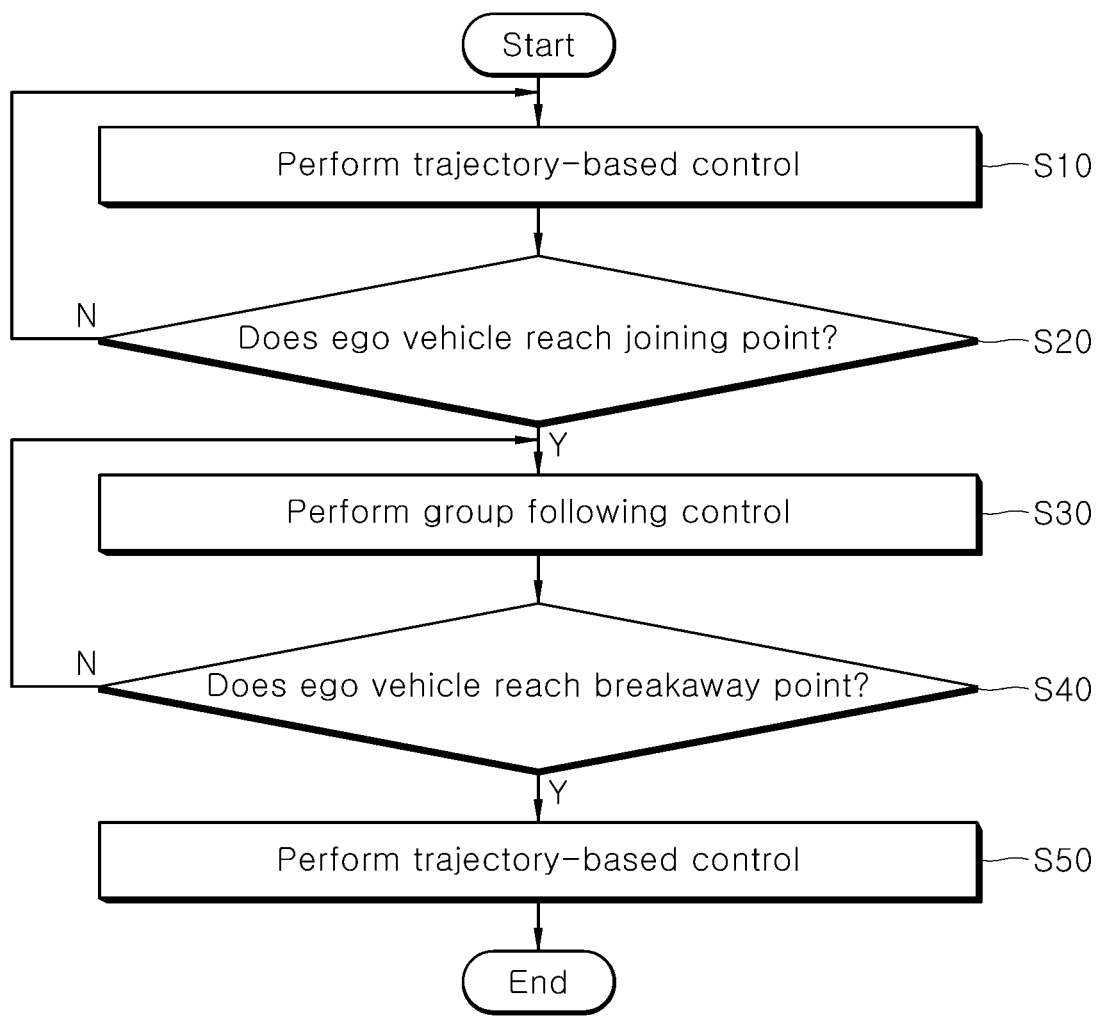

FIGS. 8 and 9 are flowcharts for describing an autonomous driving method according to an embodiment of the present disclosure.

Referring to FIG. 8, the autonomous driving method according to an embodiment of the present disclosure may include step S100 of determining, by the processor 610, whether it is necessary to correct an expected driving trajectory of an ego vehicle, based on the results of the detection of a surrounding vehicle around the ego vehicle by the sensor unit 500, correcting the expected driving trajectory based on a result of the determination, and performing trajectory-based control over the autonomous driving of the ego vehicle, and step S200 of performing, by the processor 610, group following control over the autonomous driving of the ego vehicle so that the ego vehicle follows the driving of a platooning group, configured with a plurality of group vehicles, when a first driving path of the ego vehicle up to a destination overlaps a second driving path of the platooning group. In this case, the processor 610 may interchangeably perform step S100 and step S200 based on whether a predefined control changeover condition is satisfied.

At step S100, the processor 610 generates an actual driving trajectory of the surrounding vehicle based on driving information of the surrounding vehicle detected by the sensor unit 500, generates an expected driving trajectory of the surrounding vehicle based on map information stored in the memory 620, and determines that it is necessary to correct the expected driving trajectory of the ego vehicle, when a trajectory error between the actual driving trajectory and expected driving trajectory of the surrounding vehicle is a preset threshold value or more. Accordingly, the processor 610 performs the trajectory-based control over the autonomous driving of the ego vehicle based on the corrected expected driving trajectory.

At step S200, the processor 610 performs the group following control from a joining point, at which an overlap between the first and second driving paths is initiated, to a breakaway point, at which the overlap between the first and second driving paths is terminated, in the direction in which the ego vehicle travels up to the destination.

The configuration in which trajectory-based control and group following control are interchanged based on whether a control changeover condition is satisfied is described below with reference to FIG. 9. When an ego vehicle reaches a joining point (S20) in a process of performing trajectory-based control from a current location of the ego vehicle (S10), the processor 610 determines that a group following control changeover condition has been satisfied, and performs group following control (S30). Furthermore, when the ego vehicle reaches a breakaway point (S40) in the process of performing the group following control from the joining point, the processor 610 determines that a trajectory-based control changeover condition has been satisfied, and performs trajectory-based control (S50).

The processor 610 determines the joining point and the breakaway point for performing the group following control among a plurality of candidate joining points and a plurality of candidate breakaway points. In order to minimize the time taken for the ego vehicle to reach a destination, at step S200, the processor 610 determines, as the joining point and breakaway point, a candidate joining point and candidate breakaway point, respectively, at which a total time required is a minimum, the total time required indicating the sum of the time taken for the ego vehicle to reach from the current location to the candidate joining point based on trajectory-based control, the time taken for the ego vehicle to reach from the candidate joining point to the candidate breakaway point based on group following control, and the time taken for the ego vehicle to reach from the candidate breakaway point to the destination based on the trajectory-based control.

At step S200, the processor 610 may divide a platooning group into a preceding driving group, a middle driving group and a following driving group using a predefined group classification algorithm, may determine a driving group to which an ego vehicle belongs among the driving groups, and may change a surrounding object detection area of the sensor unit 500 based on a result of the determination. Specifically, if the ego vehicle belongs to the preceding driving group, the processor 610 may detect a surrounding object ahead of the ego vehicle using the sensor unit 500. If the ego vehicle belongs to the middle driving group, the processor 610 may detect a surrounding object on either side of the ego vehicle using the sensor unit 500. If the ego vehicle belongs to the following driving group, the processor 610 may detect a surrounding object in the rear of the ego vehicle using the sensor unit 500.

Furthermore, at step S200, the processor 610 may control a sensing parameter of the sensor unit 500 to have a value mutually dependent on a sensing parameter of a sensing unit mounted on each of group vehicles. Specifically, the processor 610 may control the sensing parameter of the sensor unit 500 in response to a sensor control signal transmitted by the leader vehicle of a platooning group. The sensor control signal may be defined as a signal generated for each of group vehicles and transmitted to each of the group vehicles by the leader vehicle, based on a driving environment of the platooning group and the location of each of the group vehicles within the platooning group, so that a detection area and detection performance for a surrounding object can be optimized at the level of the platooning group. If the ego vehicle has the position of a leader vehicle in the platooning group, the processor 610 may generate a sensor control signal for each group vehicle belonging to the platooning group and transmit the sensor control signal to each of the group vehicles, based on the results of the detection of a surrounding object by the sensor unit 500 and the location of each of the group vehicles within the platooning group.

As described above, in the present embodiment, a computational load of autonomous driving control by an autonomous vehicle can be reduced, the intervention of a passenger in driving control over the autonomous vehicle in a process of reaching up to a destination can be minimized to improve convenience of the passenger, and the autonomous vehicle can reach the destination within the shortest time, because the autonomous vehicle interchangeably performs trajectory-based control over autonomous driving based on a driving trajectory correction and group following control for following the driving of a platooning group, for each given section in a path of the autonomous vehicle from a current location to the destination.

Furthermore, in the present embodiment, a total of resources of a system necessary for each of group vehicles, belonging to a platooning group, to detect a surrounding object can be reduced at the level of all the group vehicles that perform platooning, because each of the group vehicles operates to change a surrounding object detection area of a sensor unit mounted on the group vehicle based on a relative location of an ego vehicle to another group vehicle, belonging to a platooning group, when performing group following control.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An autonomous driving apparatus comprising:
a sensor unit configured to detect a surrounding object including a surrounding vehicle around an autonomously-traveling ego vehicle;
a memory configured to store map information; and
a processor configured to control autonomous driving of the ego vehicle based on an expected driving trajectory generated based on the map information stored in the memory,
wherein:
the processor is configured to:
correct the expected driving trajectory of the ego vehicle, based on results of detection of a surrounding vehicle around the ego vehicle by the sensor unit, and perform trajectory-based control over the autonomous driving of the ego vehicle; and
perform group following control over the autonomous driving of the ego vehicle such that the ego vehicle follows a driving of a platooning group configured with a plurality of group vehicles, when a first driving path of the ego vehicle up to a destination overlaps a second driving path of the platooning group;
when performing the group following control, the processor is configured to control a sensing parameter of the sensor unit of the ego vehicle to have a value mutually dependent on a sensing parameter of a sensor unit mounted on each of the group vehicles;
the sensing parameter of the sensor unit of the ego vehicle and the sensing parameter of the sensor unit mounted on each of the group vehicles comprise a field of view (FOV); and
the mutually dependent relation between the FOVs of the sensor unit of the ego vehicle and the sensor units of the group vehicles is optimized to:
minimize an overlap range of the FOVs of the sensor unit of the ego vehicle and the sensor units of the group vehicles; and
when a blind spot occurs in which a surrounding object is not able to be detected by the sensor unit of the ego vehicle and the sensor unit of another vehicle of the group vehicles, extend one or more of the FOVs of the sensor unit of the ego vehicle and the sensor unit of the another vehicle of the group vehicles to remove the blind spot.

2. The autonomous driving apparatus of claim 1, wherein:
when performing the trajectory-based control, the processor is configured to:
generate an actual driving trajectory of the surrounding vehicle based on driving information of the surrounding vehicle detected by the sensor unit;
generate an expected driving trajectory of the surrounding vehicle based on the map information stored in the memory; and
correct the expected driving trajectory of the ego vehicle, when a trajectory error between the actual driving trajectory and expected driving trajectory of the surrounding vehicle is a preset threshold value or more; and
when performing the group following control, the processor is configured to perform the group following control from a joining point, at which an overlap between the first and second driving paths is initiated, to a breakaway point, at which the overlap between the first and second driving paths is terminated, in a direction in which the ego vehicle travels up to the destination.

3. The autonomous driving apparatus of claim 2, wherein:
the processor is configured to interchangeably perform the trajectory-based control and the group following control based on whether a predefined control changeover condition is satisfied; and
the control changeover condition comprises a group following control changeover condition for a change from the trajectory-based control to the group following control and a trajectory-based control changeover condition for a change from the group following control to the trajectory-based control.

4. The autonomous driving apparatus of claim 3, wherein the processor is configured to:
determine that the group following control changeover condition is satisfied and perform the group following control when the ego vehicle reaches the joining point in a process of performing the trajectory-based control from a current location of the ego vehicle; and
determine that the trajectory-based control changeover condition is satisfied and perform the trajectory-based control when the ego vehicle reaches the breakaway point in a process of performing the group following control from the joining point.

5. The autonomous driving apparatus of claim 4, wherein:
the processor is configured to determine the joining point and the breakaway point for performing the group following control among a plurality of candidate joining points and a plurality of candidate breakaway points; and
the processor is configured to determine, as the joining point and the breakaway point, a candidate joining point and a candidate breakaway point, respectively, at which a total time required is a minimum, the total time required indicating a sum of a time taken for the ego vehicle to reach from the current location to the candidate joining point based on the trajectory- based control, a time taken for the ego vehicle to reach from the candidate joining point to the candidate breakaway point based on the group following control, and a time taken for the ego vehicle to reach from the candidate breakaway point to the destination based on the trajectory- based control.

6. The autonomous driving apparatus of claim 1, wherein, when performing the group following control, the processor is configured to change a surrounding object detection area of the sensor unit based on a relative location of the ego vehicle for a group vehicle belonging to the platooning group.

7. The autonomous driving apparatus of claim 6, wherein, when performing the group following control, the processor is configured to:
divide the platooning group into a preceding driving group, a middle driving group, and a following driving group using a predefined group classification algorithm;
determine a driving group to which the ego vehicle belongs among the driving groups; and
change the surrounding object detection area of the sensor unit based on a result of the determination.

8. The autonomous driving apparatus of claim 7, wherein the processor is configured to:
detect a surrounding object ahead of the ego vehicle through the sensor unit when the ego vehicle belongs to the preceding driving group;

detect a surrounding object on either side of the ego vehicle through the sensor unit when the ego vehicle belongs to the middle driving group; and
detect a surrounding object behind the ego vehicle through the sensor unit when the ego vehicle belongs to the following driving group.

9. The autonomous driving apparatus of claim 1, wherein:
the processor is configured to control the sensing parameter of the sensor unit of the ego vehicle in response to a sensor control signal transmitted by a leader vehicle of the platooning group; and
the sensor control signal is generated for each of the group vehicles and transmitted to each of the group vehicles by the leader vehicle, based on a driving environment of the platooning group and a location of each of the group vehicles within the platooning group, such that a detection area and detection performance for a surrounding object are optimized at a level of the platooning group.

10. The autonomous driving apparatus of claim 9, wherein the processor is configured to generate the sensor control signal for each of the group vehicles belonging to the platooning group and transmit the sensor control signal to each of the group vehicles, based on a result of detection of a surrounding object by the sensor unit and the location of each of the group vehicles within the platooning group, when the ego vehicle has a position of the leader vehicle of the platooning group.

11. A method of controlling autonomous driving in an autonomous driving system including a sensor unit configured to detect a surrounding object comprising a surrounding vehicle around an autonomously-traveling ego vehicle, a memory configured to store map information, and a processor configured to control autonomous driving of the ego vehicle based on an expected driving trajectory generated based on the map information stored in the memory, the method comprising:
correcting, by the processor, the expected driving trajectory of the ego vehicle, based on results of detection of the surrounding vehicle around the ego vehicle by the sensor unit, and performing, by the processor, trajectory-based control over the autonomous driving of the ego vehicle, and
performing, by the processor, group following control over the autonomous driving of the ego vehicle so that the ego vehicle follows a driving of a platooning group configured with a plurality of group vehicles, when a first driving path of the ego vehicle up to a destination overlaps a second driving path of the platooning group,
wherein:
in the performing of the group following control, the processor controls a sensing parameter of the sensor unit of the ego vehicle to have a value mutually dependent on a sensing parameter of a sensor unit mounted on each of the group vehicles;
the sensing parameter of the sensor unit of the ego vehicle and the sensing parameter of the sensor unit mounted on each of the group vehicles comprise a field of view (FOV); and
the mutually dependent relation between the FOVs of the sensor unit of the ego vehicle and the sensor units of the group vehicles is optimized to:
minimize an overlap range of the FOVs of the sensor unit of the ego vehicle and the sensor units of the group vehicles; and
when a blind spot occurs in which a surrounding object is not able to be detected by the sensor unit of the ego vehicle and the sensor unit of another vehicle of the group vehicles, extend one or more of the FOVs of the sensor unit of the ego vehicle and the sensor unit of the another vehicle of the group vehicles to remove the blind spot.

12. The method of claim 11, wherein:
in the performing of the trajectory-based control, the processor generates an actual driving trajectory of the surrounding vehicle based on driving information of the surrounding vehicle detected by the sensor unit, generates an expected driving trajectory of the surrounding vehicle based on the map information stored in the memory, and corrects the expected driving trajectory of the ego vehicle when a trajectory error between the actual driving trajectory and expected driving trajectory of the surrounding vehicle is a preset threshold value or more; and
in the performing of the group following control, the processor performs the group following control from a joining point, at which an overlap between the first and second driving paths is initiated, to a breakaway point, at which the overlap between the first and second driving paths is terminated, in a direction in which the ego vehicle travels up to the destination.

13. The method of claim 12, wherein:
the processor interchangeably performs the trajectory-based control and the group following control based on whether a predefined control changeover condition is satisfied; and
the control changeover condition comprises a group following control changeover condition for a change from the trajectory-based control to the group following control and a trajectory-based control changeover condition for a change from the group following control to the trajectory-based control.

14. The method of claim 13, wherein the processor:
determines that the group following control changeover condition is satisfied and performs the group following control when the ego vehicle reaches the joining point in a process of performing the trajectory-based control from a current location of the ego vehicle; and
determines that the trajectory-based control changeover condition is satisfied and performs the trajectory-based control when the ego vehicle reaches the breakaway point in a process of performing the group following control from the joining point.

15. The method of claim 14, wherein:
in the performing of the group following control, the processor determines the joining point and the breakaway point for performing the group following control among a plurality of candidate joining points and a plurality of candidate breakaway points; and
the processor determines, as the joining point and the breakaway point, a candidate joining point and a candidate breakaway point, respectively, at which a total time required is a minimum, the total time required indicating a sum of a time taken for the ego vehicle to reach from the current location to the candidate joining point based on the trajectory-based control, a time taken for the ego vehicle to reach from the candidate joining point to the candidate breakaway point based on the group following control, and a time taken for the ego vehicle to reach from the candidate breakaway point to the destination based on the trajectory-based control.

16. The method of claim 11, wherein, in the performing of the group following control, the processor changes a surrounding object detection area of the sensor unit based on a relative location of the ego vehicle for a group vehicle belonging to the platooning group.

17. The method of claim 16, wherein, in the performing of the group following control, the processor divides the platooning group into a preceding driving group, a middle driving group, and a following driving group using a predefined group classification algorithm, determines a driving group to which the ego vehicle belongs among the driving groups, and changes the surrounding object detection area of the sensor unit based on a result of the determination.

18. The method of claim 17, wherein, in the performing of the group following control, the processor:
- detects a surrounding object ahead of the ego vehicle through the sensor unit when the ego vehicle belongs to the preceding driving group;
- detects a surrounding object on either side the ego vehicle through the sensor unit when the ego vehicle belongs to the middle driving group; and
- detects a surrounding object behind the ego vehicle through the sensor unit when the ego vehicle belongs to the following driving group.

19. The method of claim 11, wherein:
- in the performing of the group following control, the processor controls the sensing parameter of the sensor unit of the ego vehicle in response to a sensor control signal transmitted by a leader vehicle of the platooning group; and
- the sensor control signal is generated for each of the group vehicles and transmitted to each of the group vehicles by the leader vehicle based on a driving environment of the platooning group and a location of each of the group vehicles within the platooning group, such that a detection area and detection performance for a surrounding object are optimized at a level of the platooning group.

20. The method of claim 19, wherein, in the performing of the group following control, the processor generates the sensor control signal for each of the group vehicles belonging to the platooning group and transmits the sensor control signal to each of the group vehicles, based on a result of detection of a surrounding object by the sensor unit and the location of each of the group vehicles within the platooning group, when the ego vehicle has a position of the leader vehicle of the platooning group.

* * * * *